United States Patent
Watson

(10) Patent No.: US 11,868,852 B1
(45) Date of Patent: Jan. 9, 2024

(54) INTROSPECTION OF MACHINE LEARNING ESTIMATIONS

(71) Applicant: Amazon Technologies, Inc., Reno, NV (US)

(72) Inventor: Alexander Watson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1379 days.

(21) Appl. No.: 15/587,181

(22) Filed: May 4, 2017

(51) Int. Cl.
*G06N 20/00* (2019.01)
*H04L 9/40* (2022.01)

(52) U.S. Cl.
CPC ............. *G06N 20/00* (2019.01); *H04L 63/10* (2013.01); *H04L 63/20* (2013.01)

(58) Field of Classification Search
CPC ...... G06N 5/025; G06N 20/20; G06N 3/0445; G06N 3/08; G06N 3/084; G06N 5/003; G06N 5/045; G06N 7/005; G06N 20/00; G06N 5/04; G06N 5/022; G06N 3/0454; G06N 7/02; G06N 3/04; G06N 3/0481; G06N 3/0472; G06N 3/105; G06N 3/02; G06N 3/082; G06N 5/02; G06N 20/10; G06N 3/063; G06N 3/008; G06N 3/0436; G06N 3/088; G06N 3/10; G06N 3/123; G06N 5/027; G06N 5/043; G06N 7/023; G06F 16/285

See application file for complete search history.

(56) References Cited

U.S. PATENT DOCUMENTS

2020/0067861 A1* 2/2020 Leddy .................... H04L 51/12

OTHER PUBLICATIONS

Palczewska et al., Interpreting Random Forest Classification Models Using a Feature Contribution Method, 2014, Integration of Reusable Systems, pp. 193-218 (Year: 2014).*
Jacomy et al., ForceAtlas2, a Continuous Graph Layout Algorithm for Handy Network Visualization Designed for the Gephi Software, 2014 (Year: 2014).*
Zhao, Guodong, et al., Effective feature selection using feature vector graph for classification, 2014, Neurocomputing 151 (2015), pp. 376-389 (Year: 2014).*
Henelius, Andreas, Clustering with Confidence: Finding Clusters with Statistical Guarantees, 2016 (Year: 2016).*
Abul, Osman, et al., Cluster Validity Analysis Using Subsampling, 2003 (Year: 2003).*
http://scikit-learn.org/stable/modules/generated/sklearn.ensemble.RandomForestRegressor.html, 10 pages.
http://blog.datadive.net/interpreting-random-forests, 10 pages.

* cited by examiner

*Primary Examiner* — Ann J Lo
*Assistant Examiner* — Charles C Kuo
(74) *Attorney, Agent, or Firm* — Hogan Lovells US LLP

(57) ABSTRACT

A machine learning algorithm, such as a random forest regressor, can be trained using a set of annotated data objects to estimate the risk or business value for an object. The feature contributions for each data object can be analyzed and a representation generated that clusters data objects by feature contributions. Any clustering of data objects with incorrect scores in the visualization can be indicative of gaps in the regressor training. Adjustments to the inputs can be made, and the regressor retrained, to eliminate clustering of errors for similar feature contributions. Correcting the risk score estimations can ensure that the appropriate security policies and permissions are applied to each data object.

20 Claims, 9 Drawing Sheets

INTROSPECTION OF MACHINE LEARNING ESTIMATIONS

BACKGROUND

Users are increasingly performing a variety of tasks using computing resources, which creates a need to improve the way in which the resources perform these tasks. Approaches such as machine learning have been developed that enable computing resources to improve or become more accurate over time as additional data is obtained and processed. While such approaches can be highly accurate, there is little information available as to why certain decisions were made. If a determination is in accurate, it is difficult to tell why the decision was made, as well as whether the inaccuracy was due to a random set of circumstances or whether there is an issue with the training of the model or algorithm used.

BRIEF DESCRIPTION OF THE DRAWINGS

Various embodiments in accordance with the present disclosure will be described with reference to the drawings, in which.

DETAILED DESCRIPTION

Figure 1:
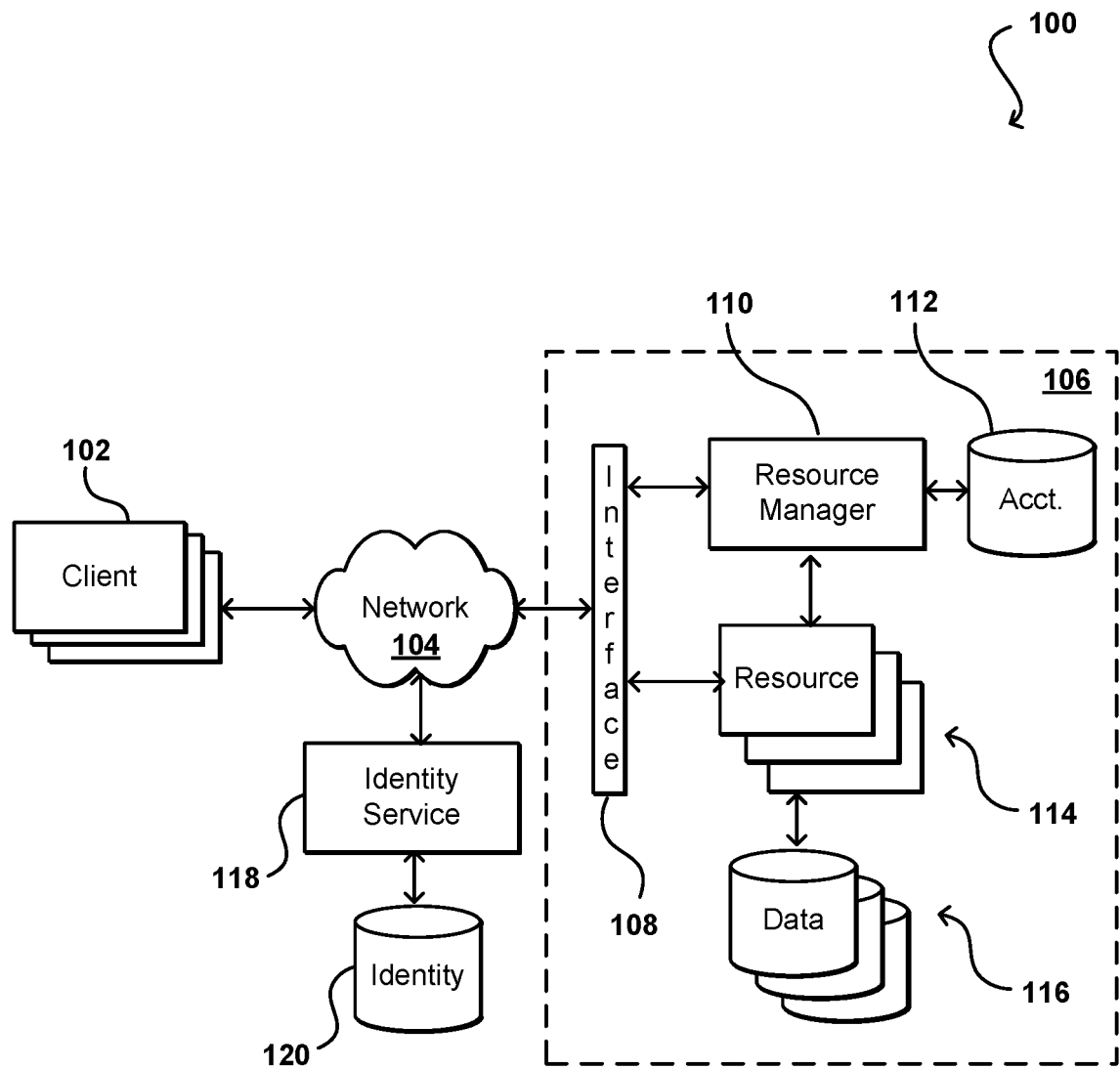
FIG. 1 illustrates an example environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for security and access management for a corpus of data objects, such as files and documents, stored for an entity. In particular, approaches can utilize a random forest regressor, or other such classifier or machine learning algorithm, to attempt to estimate risk scores for various data objects. Random forests can be used to process various types of data objects stored or transmitted across an environment. Attempts can be made to estimate or predict the risk or business value associated with the data object, for example, in order to determine how to secure the data object, the permissions to grant on the data object, etc. The risk level for the data object can be estimated based on a variety of factors, referred to herein as features of the data object. These features can include not only keywords that have been specified as being of importance, for example, but also values relating to the type of content of the data object, the types of users who have accessed or downloaded the data object, how frequently the data object is accessed, time since last access, or whether the data object has been shared externally, among others. The complexity and potential volume of data can make such determinations difficult to do programmatically. In order to determine a measure of risk, customers or users can be enabled to annotate or identify the types of features that are important to the relevant business, for example, and provide a risk score that they believe is appropriate for that data object. In examples herein the risk score goes from 1-10 on a linear scale, but various other scores and scales can be used as well within the scope of the various embodiments. This information can then be used to train and test the random forests for purposes of estimating risk scores based at least in part upon these or other learned features. Once the risk is determined, it can be desirable to provide customers with information including not only the risk scores, but also information as to why the risk score was assigned or how it was determined. The features and results can be provided in such a way as to provide human readable reasons as to why a particular risk score was provided. Insight into the decision making of the algorithm can also help to improve the accuracy by identifying types of data objects, features, or relationships that are not accurately represented by the algorithm or model. The ability to explain the reasons for a decision can help to identify gaps in the regressor or training data, and enable the regressor to be retrained to help address these gaps.

Various other functions can be implemented within the various embodiments as well as discussed and suggested elsewhere herein.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. The identity information can be provided and/or verified by an identity service 118 in at least some embodiments, which can maintain identity information or credentials in a local data store 120. The identity service can be part of the resource provider environment or offered by a third party, among other such options. The identity service can provide information about identity, credentials, access roles, and the like. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, such an environment enables organizations to obtain and configure computing resources over a network such as the Internet to perform various types of computing operations (e.g., execute code, including threads, programs, software, routines, subroutines, processes, etc.). Thus, customers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

For large organizations, there might be millions of documents and data objects (or more) stored across such an environment. It can be difficult for such an organization to manage the documents, such as to determine the contents of the various documents and objects, particularly as they are updated, as well as the access, permissions, or security policies that should be applied for each of the documents and objects. While there are various conventional security mechanisms that can be utilized, such as to search for specific keywords or patterns (e.g., social security numbers, credit card numbers, or medical records), the mechanisms are limited and prone to false positives and failures. In some embodiments risk scores or other values can be applied to the various documents and data values in order to determine the appropriate policies to enforce for the documents, permissions to set for the documents, etc. Such an approach often involves a manual review and determination for each document, which can be incredibly time and resource intensive. Further the need to have a large team of employees reviewing the huge and ever changing corpus of documents can result in inconsistencies and human error in the determinations, which can result in data being improperly exposed or accessible. Further, the delays caused by the need for manual review and assessment can prevent the documents from being available for a period of time, which may not be acceptable for many customers, implementations, or environments.

Accordingly, embodiments in accordance with the various embodiments can provide a document security management and/or assessment service that can help protect against the compromise and theft of documents, data, and other intellectual property. Customers having accounts with such a service provider, who in at least some embodiments is also the resource provider providing the multi-tenant resource environment, can utilize various tools and interfaces to obtain information about their stored documents, and can receive reports or determinations for risk scores assigned to their documents, as well as information about the features used to arrive at such a determination. This can help to protect the documents stored in such a multi-tenant environment, or resource provider environment, often referred to as storage in "the cloud." Customers can also have the ability to provide corrections or adjustments to the risk scores assigned to various documents or data objects, for example, which can be used to train the models or algorithms used to make the determinations. Further still, the ability to obtain information about the documents to which scores were incorrectly assigned can further help to identify gaps in the model or types of documents where additional training may be warranted.

Figure 2:
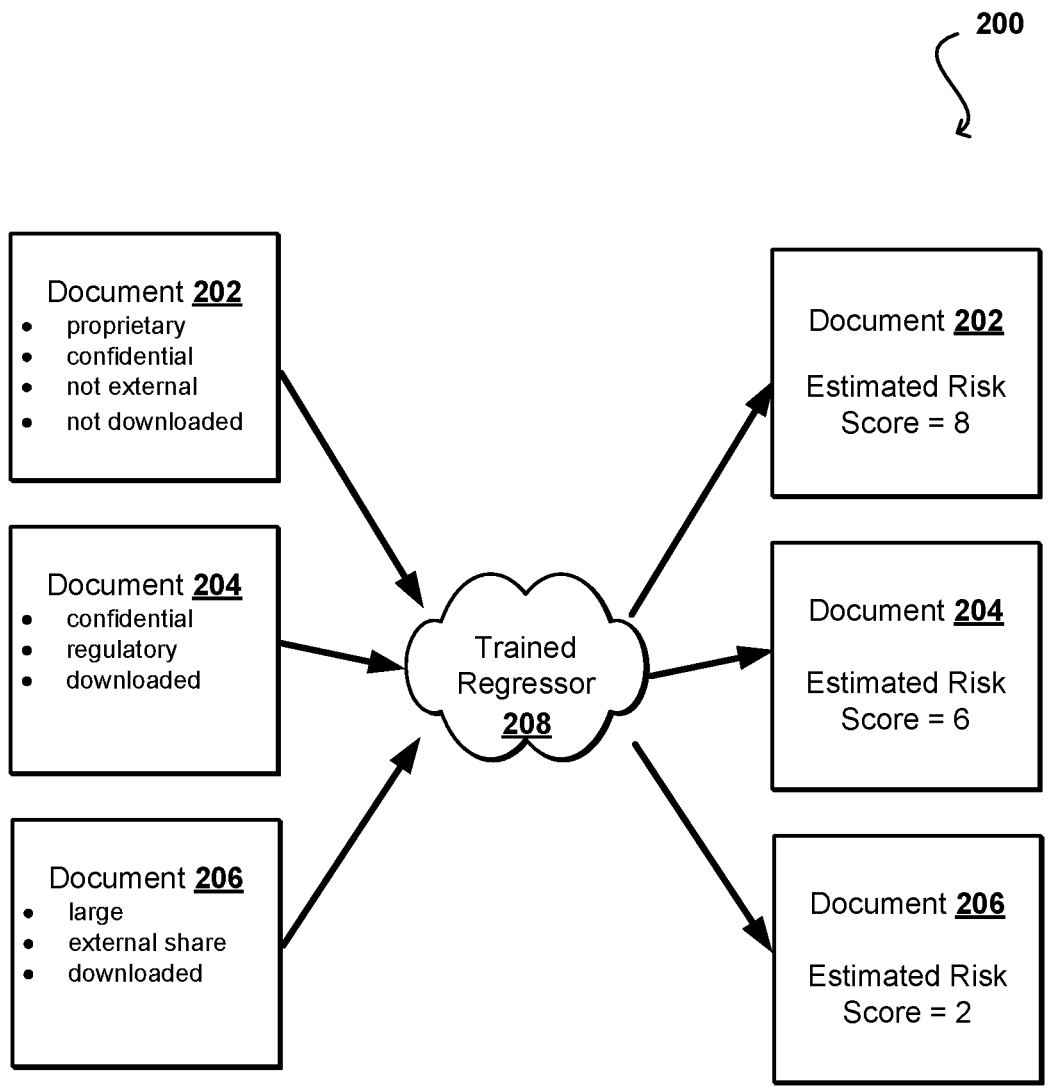
FIG. 2 illustrates an example approach to determining risk scores for a set of documents that can be utilized in accordance with various embodiments.

FIG. 2 illustrates an example approach 200 for assigning risk scores to documents that can be utilized in accordance with various embodiments. Although documents are utilized in this example for purposes of explanation, it should be understood that other types of files or content can be processed as well within the scope of the various embodiments. In this example, a first document 202 has various features that can be used to determine a risk score for the document. The first document is proprietary, confidential, and has not been shared externally or downloaded by anyone in the relevant company. The second document 204 has a different, but partially overlapping, set of features, in that it is confidential, relates to regulatory content, but has been downloaded by several people across the company. The third document 206 has yet another set of relevant features, in that it has been downloaded by several people across the company, is a large document, and has been shared externally.

In order to assign risk scores to these documents, the documents (or at least a subset of data for those documents) can be processed with a trained regressor 208 or classifier, such as may utilize a random forest-based approach as discussed elsewhere herein. The regressor 208 can have been trained with a set of labeled data, such as a set of annotated documents having assigned risk scores and a variety of different features determined to contribute to those risk scores. The regressor can analyze those documents to determine relationships between the features that result in the various risk scores, and can develop weightings of the various features, additional features, and other aspects that then correlate with the resulting risk scores. When the documents 202, 204, 208 are processed with the trained regressor, the features for each document are determined and their relationships used to generate a risk score for each document based on what was learned or modeled by the regressor. As illustrated, the first document 202 was determined to have a risk score (on a scale of 1-10) of 8, the second document 204 was determined to have a risk score of 6, and the third document was determined to have a risk score of 2.

It may be the case, however, that at least one of these risk scores differs appreciably from what the corresponding document owner would indicate as the risk, such as the importance to the business or the amount of damage that would be incurred if the document were to be leaked or accessed by an unauthorized party. While information such as the weightings of the various features can be determined from a regressor or other such algorithm or approach, much of the determination logic is hidden within the regressor. There is no conventional way to determine how much each feature contributed to the assigned score, for example, to learn why the assigned score was determined incorrectly. While in some instances the document will represent a new type of document that the regressor has not yet encountered or utilized for training, in other instances there will be something about the way one or more features of the document are utilized that result in the inaccurate determination. In many instances there will be other documents with similar features, or combinations of features, that will also have inaccurate scores assigned for similar reasons, but conventional approaches do not provide the insight needed to make such a determination.

Accordingly, approaches in accordance with various embodiments provide introspection techniques that enable gaps or inaccuracies in document classification, file risk estimation, or other such determinations to be visualized or otherwise determinable. As mentioned, sophisticated machine learning models, such as random forests and neural networks, offer superior precision and recall for techniques such as regression, at least with respect to traditional statistical models including decision trees, by simultaneously examining complex attributes or features, as well as their interactions. As mentioned, however, these models often create a black box scenario, where it is difficult for a human to understand why a particular decision was made. Even with superior prediction or classification, it can be important to be able to determine the output of these models for purposes such as debugging or understanding gaps in classification, as well as explaining why a particular determination was made.

An example introspection approach can build, or provide data useful for building, a graph where the nodes of the graph correspond to individual documents. The relationships of document features can be considered as edges between the documents, and the strength of these edges can be determined by the number of features in common that contributed most to the relevant score determinations, such as where two specific documents are both shared globally or contain proprietary information. The graph data can be output as a series of nodes and edges that can then be used to generate a visualization of the connections. In some embodiments a visualization can be rendered for a user, while in other embodiments the data can be provided in an appropriate format, such as a comma separate variable (CSV) file, for analysis. In one embodiment, a force-atlas layout was applied, which attracts similar nodes together. This attraction has the result of building clusters of nodes in the graph.

Figure 3:
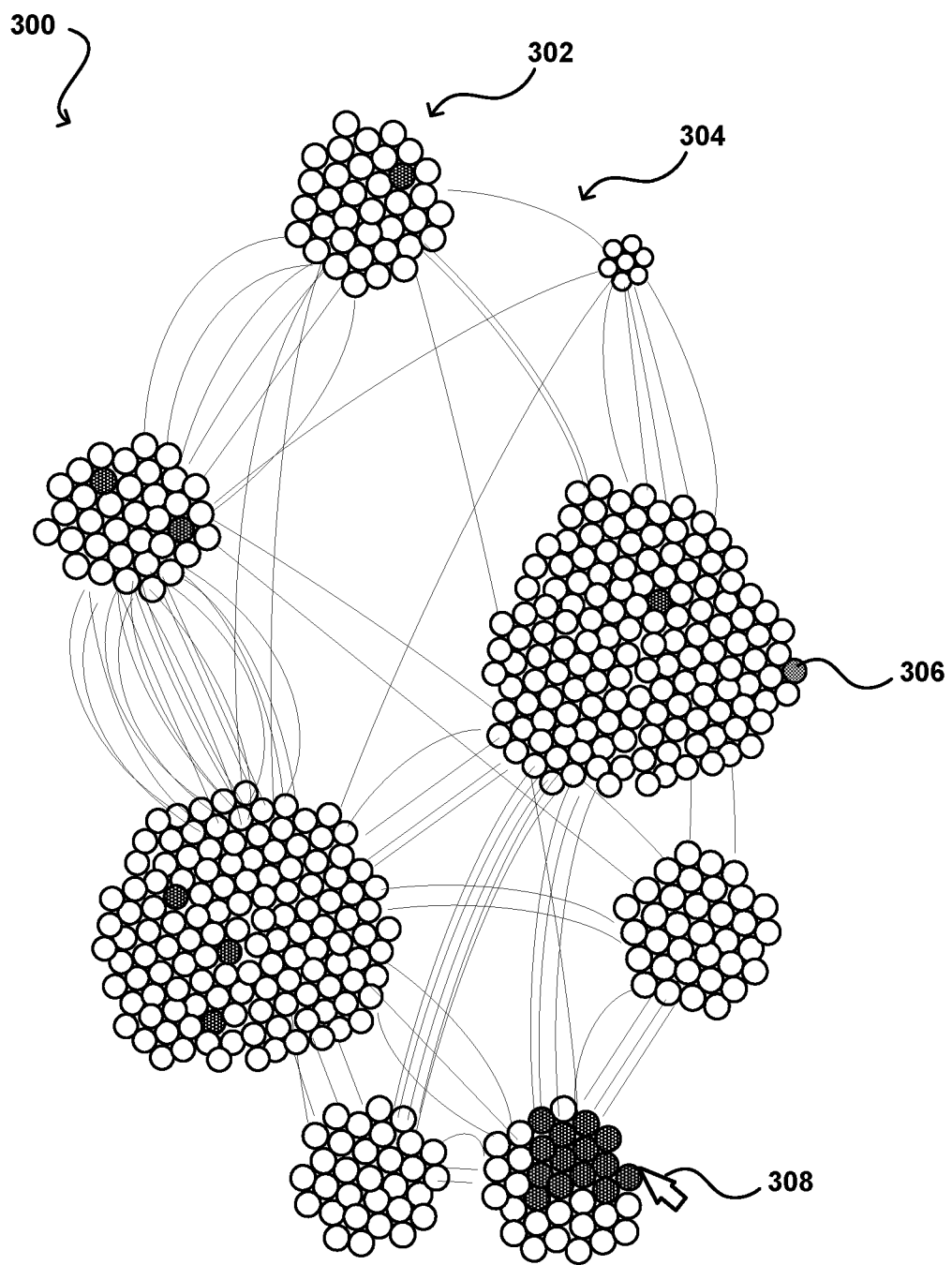
FIG. 3 illustrates an example visualization of documents related by features that can be generated in accordance with various embodiments.

As an example, FIG. 3 illustrates a visualization 300 that can be generated using document data processed by an example random forest in accordance with various embodiments. In this example, each node corresponds to a document that was processed using the random forest. The analyzed features and their relative contributions can result in their placement in the graph, as well as clustering based upon similarity as discussed previously. Any feedback obtained for the documents, such as whether the assigned risk score was inaccurate (or inaccurate by more than an allowable amount or threshold), can be used to change the visualization of the node in the graph. In this example, the visualization 300 is generated from an automated process, and can then be interpreted by a human or by a machine. This visualization defaults to clusters 302 of nodes having a white color, or no patterned fill. The relationships of document features are represented as visual edges 304 or relationships between the documents, and the strength of these edges can be indicated by aspects such as the thicknesses and/or colors of the lines, among other such options. When it is determined that the risk score assigned for a node is inaccurate, the color for those nodes 304 can be changed, in this example to include a fill pattern. The color of the node can depend, in some embodiments, upon an extent of the inaccuracy, whereby green nodes are determined to be accurate, yellow nodes are determined to be slightly inaccurate, and red nodes are determined to be highly inaccurate, among other such color schemes. In this way, it can readily be determined which documents were given inaccurate scores, and how those documents are related. It will often be the case that there will be individual documents scattered across the graph that were assigned inaccurate scores, based on those particular types of documents or combinations of features not having been encountered previously and used for training the regressor. In this example, however, there are clusters or groups of documents that are near to each other in the graph, which indicates that there is likely an issue with the trained repressor that needs to be resolved to improve the accuracy for those types of documents. As an example, node 306 corresponds to a false positive, but overall the majority of the clusters were properly scored such that the system can have relatively high confidence that documents with these features are being interpreted or processed properly, with relatively accurate risk scores being estimated. In this example, however nodes that received positive feedback are not highlighted or distinguished, so the comparison may actually be the percentage or fraction of node with feedback which are positive versus negative, instead of the number of nodes in a cluster as a whole.

The example visualization 300 utilizes an annotated testing set whereby documents were annotated as to whether they had accurate or inaccurate determinations, which can also be considered as true positives or false positives with respect to the classification for other applications. Groupings or relations between the false positives can be quickly identified, indicating in this example that there is a group of similar documents that are not accurately or sufficiently represented in the training data. Such an approach can provide for the quick identification of detection gaps, and the ability to obtain information regarding the features of those documents enables those gaps to be addressed. Any patterns or significant groupings can also indicate that the inaccuracies were not randomly dispersed but due in fact to the inability to look at the features correctly across the entire dataset. If a determination can be made as to the type(s) of data not represented by the training set, then an attempt can be made to retrain the model or regressor using properly categorized documents or data of those types. For example, a human could quickly look at the example visualization 300 and determine that a particular grouping of nodes 308 had inaccurate risk score estimations and should be an area of focus. A system trying to make a real time regression decision could look at the same cluster and, based on this and other things it may have encountered previously, determine that the system is not very confident in these decisions, and could attempt to adjust the feature selections and retrain, or perform another such action. For example, a user might decide to move a "top feature" that is considered by the regressor, or might decide to promote one or more other features to top features that will be considered by the regressor, among other such options.

Figure 4A:
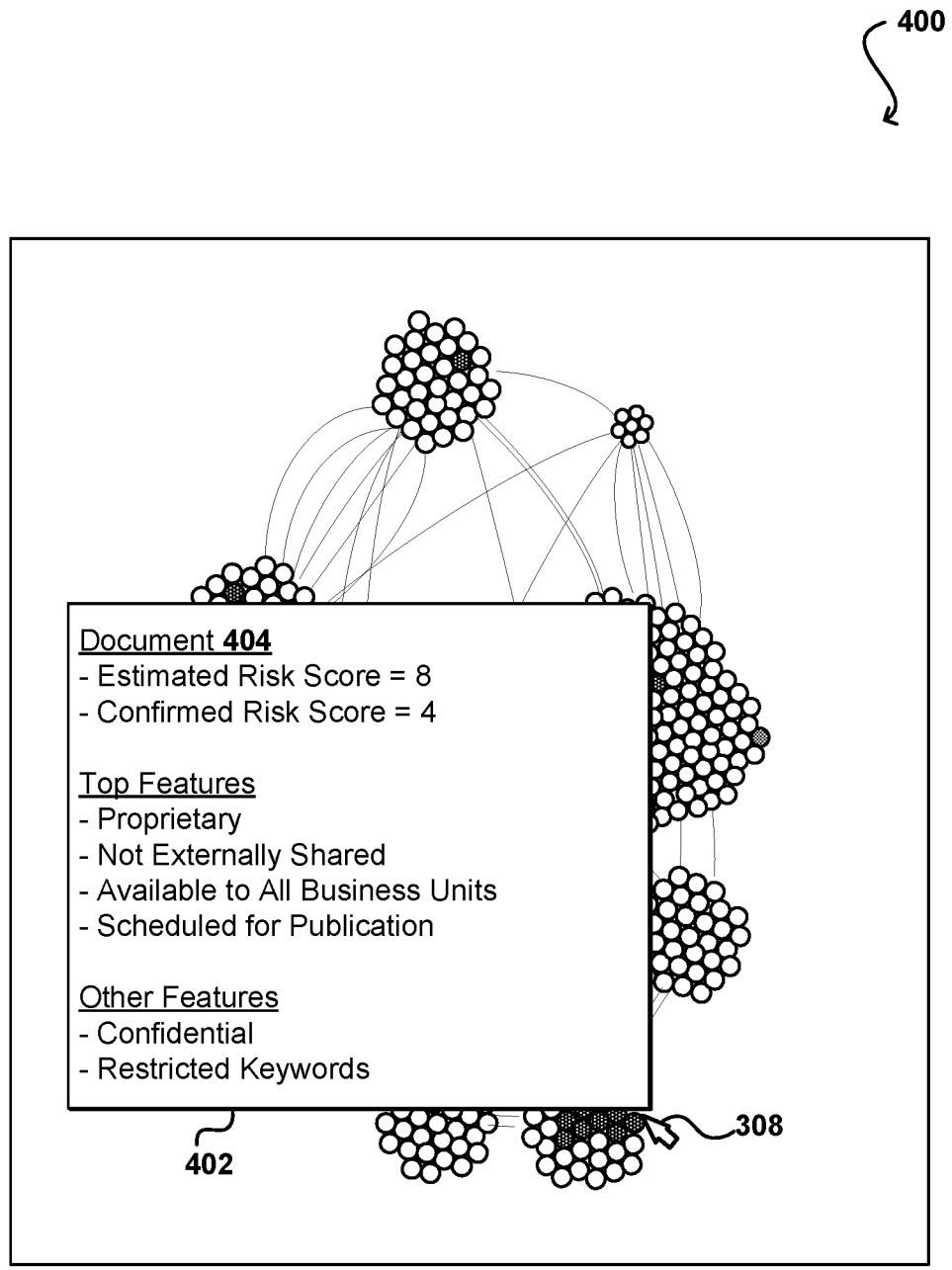
FIGS. 4A and 4B illustrate example representations enabling information about the analysis of a particular document to be obtained in accordance with various embodiments.

An interface can take advantage of such a visualization to enable a user to drill down on the various nodes as well. For example, a user can select a particular node, such as one colored as a false positive, to determine information about that particular document. For example, a user can select a node (as illustrated by the cursor 308 in FIG. 3), which can cause the interface 400 to display information 402 for the selected node or document 308, as illustrated in the example of FIG. 4A. The provided information can include, for example, the document title and assigned risk score, a link to the document, and a corrected score provided by a user or other source. The information can also indicate the relevant features for the document, as well as the importance in determining the score. For example, four of the six features are designated at "top" features that are considered by the regressor, while there are two other features that are not considered by the regressor. As illustrated, this particular document has dominant features of proprietary, not shared externally, available to all business units, and scheduled for publication. Other features include confidential content and the inclusion of one or more restricted keywords. One approach to retraining would be to try treating "confidential" as a top feature, or to remove "scheduled for publication" from the top features before the retraining.

Figure 4B:
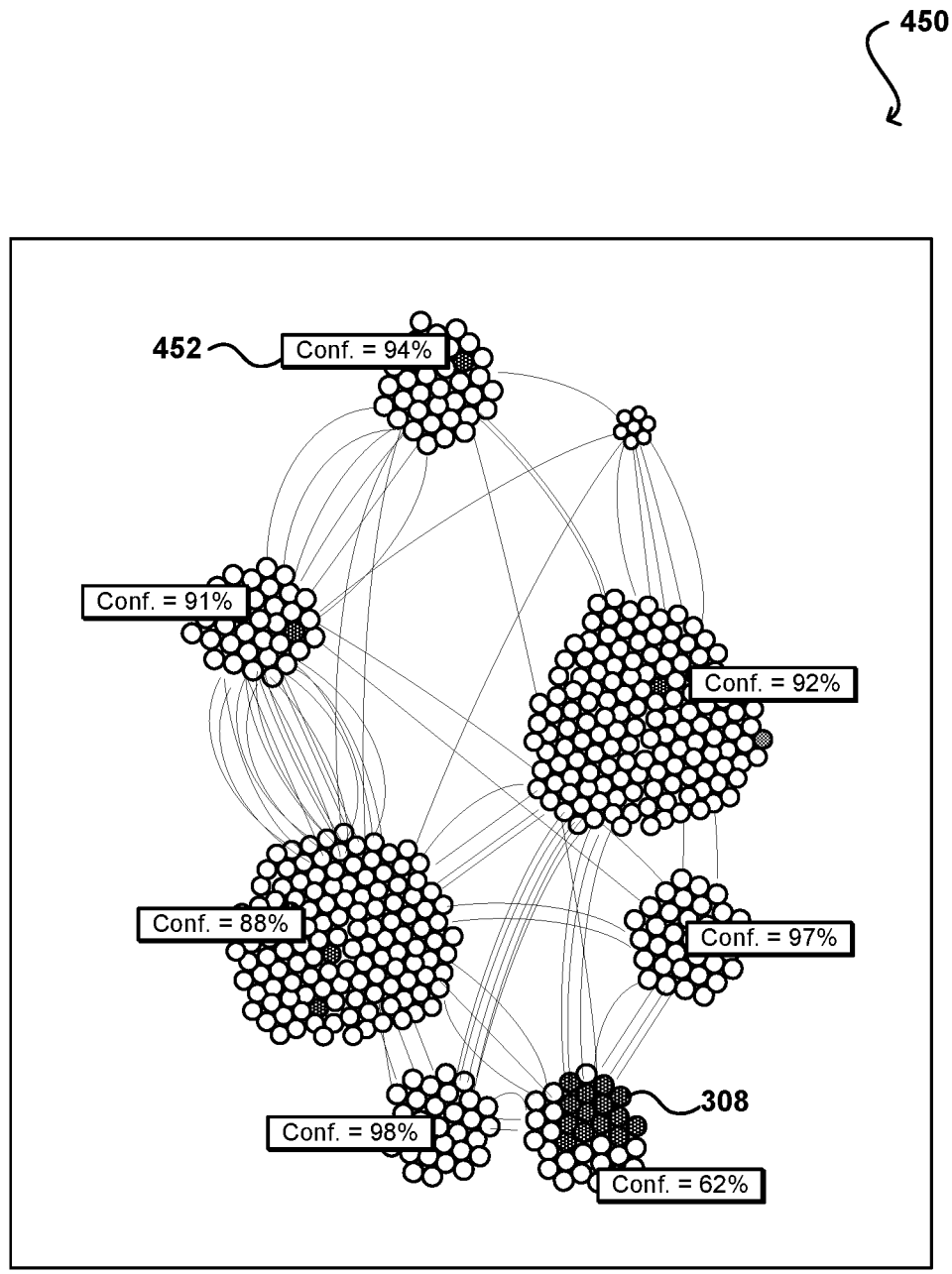

FIG. 4B illustrates another example representation that could be used with an automated process in accordance with various embodiments. In this example, the documents are clustered and then a confidence score 452 determined for each cluster. In this example, many of the clusters have confidence scores above 85%, which might be acceptable in this implementation. For a specific cluster 308, however, the confidence score is at 62%, below the 85% threshold. Accordingly, the system can look at the features of those documents and adjust which features are, or are not, considered by the regressor, and make adjustments until the confidence scores for all clusters at least meet the minimum threshold. As more data points are obtained the confidence scores can adjust, such that the regressor may need to be adjusted and/or retrained over time in order to ensure accurate risk score estimations. Further, as additional documents are received the system will attempt to assign them to the appropriate cluster, so the overall confidence level in the regressor will vary depending upon the number of documents in each cluster.

In some embodiments, a random forest regressor can be used to estimate the risk factors for each document. The random forest regressor can fit various classifying decision trees on sub-samples of the dataset, and can utilize averaging or other techniques to improve the predictive accuracy of the determinations. This approach can be used with content risk prediction, such as to predict a risk factor for an entire document, and activity risk prediction, such as to predict a risk factor based on an activity log. Each task can utilize different features, such that the generated random forests will be different, but a similar analysis can be performed for both problems. When creating a random forest model, the weight of importance of each feature used in the forest building process can be determined. When using this information to estimate a risk for a document, however, it is not straightforward to determine which feature contributed the most. Therefore, random forests are generally considered as a black box machine learning technique.

Approaches presented herein can provide visibility into this otherwise black box approach. In at least some embodiments, the dominant features that exist within the dominant trees of the random forest are analyzed, and the result can be used as a similarity metric instead of analyzing a similarity between dominant trees. This has the effect of superior performance for a regression use case, as well as the benefit of providing a human readable explanation of why the decision was made. In order to analyze the performance of a trained model, one approach begins with obtaining annotated documents that indicate whether or not the document was properly classified. The documents can then be divided into two groups, where the first group can be used to train the model and the second group can be used to test the model and generate a visualization. The first group will be used to train a random forest regressor, for example. Various values can then be estimated, using the trained regressor, for each document in the second group. These values can include, for example, a risk score, a bias value, and feature contributions. The documents can then be clustered by feature combinations, and the results used to generate the visualization, such as by representing each document as a node in the graph. Prediction errors for each document can be visualized, such as by utilizing larger document node sized for larger absolute prediction errors. Clusters of documents containing significant errors can then be identified and selected for analysis. In this example, the analysis can investigate why important features for these documents negatively influence the risk estimation process.

An approach in accordance with one embodiment utilizes the python library treeinterpreter which supports scikit-learn 0.17 and higher. This library expands the predict method, and for each document it can return a prediction value, such as an estimated risk factor, and a bias value, such as a base prediction value if the contributions of all features were zero. The library can also return a feature contribution vector, where for each feature a signed float is obtained that describes feature importance. A higher absolute value for a feature indicates a higher level of significance for that feature in the determination. The dominant features that exist within the dominant trees of the random forest can be analyzed, and the result used as a similarity metric as discussed previously. The treeinterpreter library can also be used to establish feature contributions. Example parameters can be utilized, as may include the N most contributing features, only features with a contribution greater than a minimum contribution threshold (MINCON), use categories or use features, a penalty (PENALTY) for zero intersection of contributing features, and a distance between two documents. An example distance can be defined relative to a base distance of 1.0, where for each feature F such as:

contribution(doc1, F)>MINCON and in N the most contributing contribution(doc2, F)>MINCON and in N the most contributing base-=contribution(doc1, F)*contribution(doc2, F)

if base==1, then base=PENALTY

In order to obtain document clustering for the trained model, and analyze the performance of the model, the manually annotated documents can be divided (evenly or otherwise) into two groups, including a training group for training the model and a testing group for generating a visualization for the trained model. In various embodiments, the training can involve a random forest regressor, which once trained can be used to estimate a risk, bias, and feature contribution for each document, or at least a subset of documents, in the testing group. As mentioned, the documents can be clustered by feature contributions. In some embodiments each document can be represented by a feature vector based on at least the top features and their relative or weighted contributions, and the position of the node in the graph can be based on an endpoint of each feature vector from a common vertex. A visualization can then be generated wherein each document is represented by a node or other element indicating the relatedness by features. In at least some embodiments prediction errors for each document can be visualized, such as by increasing the size of the document node in the graph to indicate larger absolute prediction errors. Clusters of documents, or other groupings of documents having close features, can be located that contain large errors. The information for those documents can then be analyzed to determine why important features for those documents negatively influenced the risk estimation process.

Various clustering approaches can be utilized as discussed herein. These can include, for example, clustering documents by feature similarities. If there are two documents that are strongly matched on a particular feature, such as above the standard deviation of similarity for all documents, a link can be created between those documents. As mentioned, a strength can be assigned to that link based at least in part upon the strength of the similarity. For example, if there are three matched features between a pair of documents then the strength of the link or edge between them may be three times as strong as for a pair of documents with only one feature in common, although different features may weigh differently on strength determinations as discussed elsewhere herein. Such an approach provides for a visualization of all data that has passed through the classifier or regressor. The visualization will not only include information for the individual documents and their features, which were used to generate the risk scores, but also provides for a visualization of clusters of documents with similar risk scores. As illustrated in FIG. 3, a graph of the clusters provides a straightforward indication of where inaccuracies exist in the model, or where additional data or training is needed. The distance between the documents and the clusters can be based at least in part upon the similarity of the features. As mentioned, customers can provide feedback about the estimated risk scores, and that information can be overlaid on top of a cluster. While randomly dispersed inaccuracies are to be expected to some extent, any grouping of inaccuracies can indicate problems or gaps in the trained regressor. This information can be surfaced to a user, but can also be utilized by a system or service to automatically retrain the model in order to improve the accuracy of the model. Any relevant documents can then be reprocessed in order to reduce any inaccuracies in the relevant risk scores. In at least some embodiments, only certain customers are able to provide feedback for consideration. In other embodiments, all customers are allowed to provide feedback and the system will look at the percentage or portion of the customers who provide positive versus negative feedback. Other embodiments might weight responses from certain customers more than others, among other such options. Further, since a risk score might be a subjective score, the ability to consider multiple sources and determine the overall consensus may provide more accurate result for at least some data sets.

In some embodiments, the introspection into the output of random forest models, or other such classifiers, can be based upon features that relate to content, access patterns, and activity. For example, content features can relate to whether a document includes account information or credential data. Access patterns can relate to who has accessed the file or can access the file, as well the mechanism(s) used to access the file. The activity data can relate to the age of the object, frequency of access, and time of last access, among other such data. When determining whether a document was improperly classified, any appropriate threshold can be applied. For example, in one embodiment where the risk is assigned on a scale of 1-10, any inaccuracy of 3 or more can be considered unacceptably inaccurate, although other values may be utilized and the value may be adjustable as well. Further, the thresholds may differ, as a document that is a 10 but estimated as a 9 or less may be unacceptable, while anything under a 5 might be classified as low risk regardless of the actual score.

Figure 5:
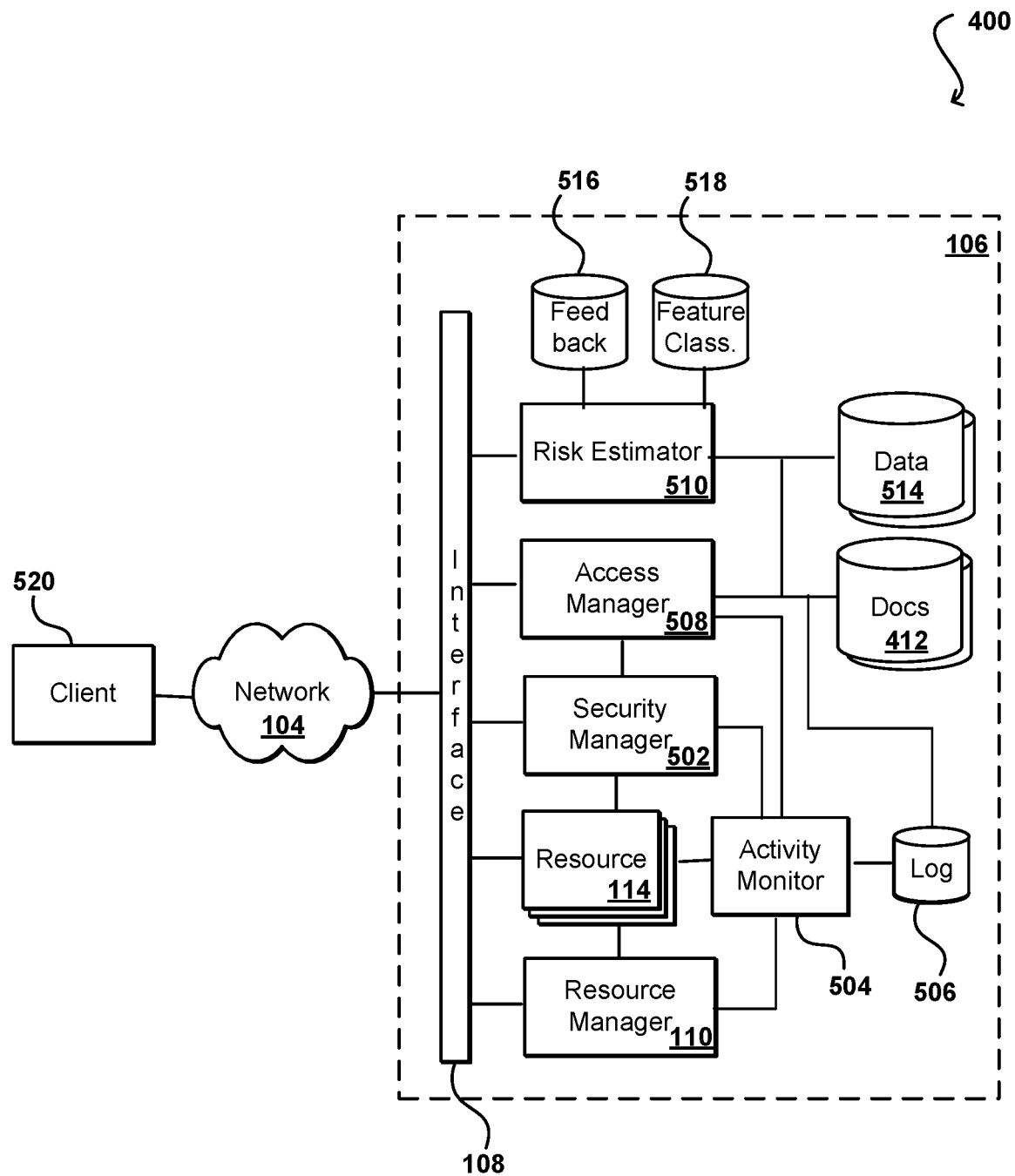
FIG. 5 illustrates an example architecture for determining risk and analyzing risk decisions that can be utilized in accordance with various embodiments.

FIG. 5 illustrates an example system 500 that can be utilized to perform functions such document analysis in accordance with various embodiments. Reference numbers may be carried over between figures to represent similar objects for simplicity of explanation, but such usage should not be interpreted as a limitation on the scope of the various embodiments unless otherwise specifically stated. As with the environment of FIG. 1, a customer can utilize a client device 520 to access resources of a resource provider environment 106 across at least one network 104. As mentioned, this can be used to store customer data, such as to at least one data repository 514, and documents to at least one document store 512, among other such options. The customer in some embodiments can utilize the client device 520 to specify security settings that can be utilized by an access manager 508, or other such system or service, to control access to various data and documents stored for the customer. As discussed in more detail elsewhere herein, various security policies can be implemented to require specific permissions, credentials, roles, or other access criteria be satisfied before a user is able to access certain data or documents. A service such as an activity monitor 504 can monitor the access of the various documents and data by various users, and store the information to a location such as an activity log 506 or other such repository. A security manager 502 can work with the access manager 508 and/or activity monitor 504 to determine the presence of unauthorized access, which can then be reported to the client device 520 otherwise provided as an alert or notification. In at least some embodiments the client device 520 can also be used to provide security settings or selections to the security manager 502 to determine the types of alerts to be generated, types of access or behavior for which to generate alerts, and other such information.

In at least some embodiments there can be any arbitrary content stored to the data stores 514 and/or document stores 512 on behalf of a customer, such as an organization. In at least some embodiments it can be desirable to analyze this content to determine the types of data, documents, and other objects stored on behalf of the customer. It can also be desirable to, based at least in part upon the analysis, assign risk scores, business value scores, or other such values to the documents, which can then be used to apply the appropriate security settings, permissions, and other such parameters. In this example a risk estimator 510 can be used to locate and analyze the various documents (and other data, etc.) stored on behalf of a customer. Other components or systems such as various classifiers may be used as well within the scope of the various embodiments. The estimator can include a random forest regressor, or other such classifier, for purposes of locating, analyzing, and evaluating contents of the data and documents, such as to identify features of the various documents. The estimator 510 can use the regressor to determine a risk score for each document, for example, that can impact the security settings or policies enforced for each document. One advantage to such an approach is that a customer can utilize the client device 520 or another such mechanism to gain visibility into the type of content that is stored for the customer, as well as the risk associated with that content. In at least some embodiments the customer can also have the ability to view the content, as well as the assigned risk scores, and make adjustments that the customer deems appropriate. These adjustments can then be used to further train the neural network in order to improve future classifications and score determinations. In at least some embodiments, the customer can also view patterns or types of access to the various documents, lists of users or peer groups who access specific documents or topics, documents with specific risk scores, and the like. The risk estimator can determine various features and feature classifications, and can store that data to at least one feature classification data repository 518, which can be used to generate visualizations for the various documents. As discussed, the risk estimator (or another such component or system) can generate visualizations that enable reasons for a risk score determination to be displayed, and the classifications of features can be used to help provide a human-understandable reason for the determination. As mentioned, a user can have the ability to provide feedback as to the accuracy of the risk scores that are assigned. This information can be stored to a feedback data store 516 or other such location, and used with the visualization to highlight documents where the risk scores were incorrect, or at least had scores outside a threshold amount from a user-determined score, among other such options. Such an approach enables a user to quickly determine clusters of documents where incorrect scores were determined in order to determine how to better train the model.

Upon receiving the visualization, user can utilize the client device 520 or another appropriate interface to analyze the documents that were incorrectly scored or classified in order to attempt to improve the regressor. This can include, for example, determining the features in common for a cluster of incorrectly scored documents and using this information to either select different features for training or weight those features differently, among other such options. If scores are assigned to features that help to determine risk then these scores can be adjusted as well. For example, if it is determine that a set of documents received incorrect scores all had the combination of proprietary content and confidential content, then an attempt can be made to use one feature or the other, or weight them differently. There can be ratings or risk values assigned to each feature that can be adjusted as well. For example, proprietary documents might have an assigned business value score that is higher than standard documents, but the relative business values applied can be adjusted in order to help improve results. If documents with proprietary content are getting incorrect scores applied, then a feature other than proprietary might be applied or the proprietary feature removed from the risk analysis in order to attempt to obtain more accurate results. If there are specific combinations of factors that are resulting in incorrect scoring, then a rule might be applied to only disregard a feature such as proprietary when in combination with the other identified features. Various other adjustments and variations can be attempted as well within the scope of the various embodiments. Some level of inaccuracy may be permissible, but any trends or clusters of documents with incorrect determinations can trigger an adjustment or retraining of the regressor in at least some embodiments. Automated dashboards or other such interfaces can enable users to obtain the risk determination information, provide feedback as to risk scores, and indicate adjustments to be tried to improve the results. In one embodiment, a user can label data that is not correctly classified which can cause the risk estimator to attempt different feature combinations, selections, or aspects relating to those incorrectly classified documents in order to attempt to generate results that provide the correct risk scores while not negatively impacting the scores of other documents or data. In some embodiments the system can be automated to perform this analysis in the background, performing clustering and score analysis, then iteratively retraining itself to improve results.

Figure 6:
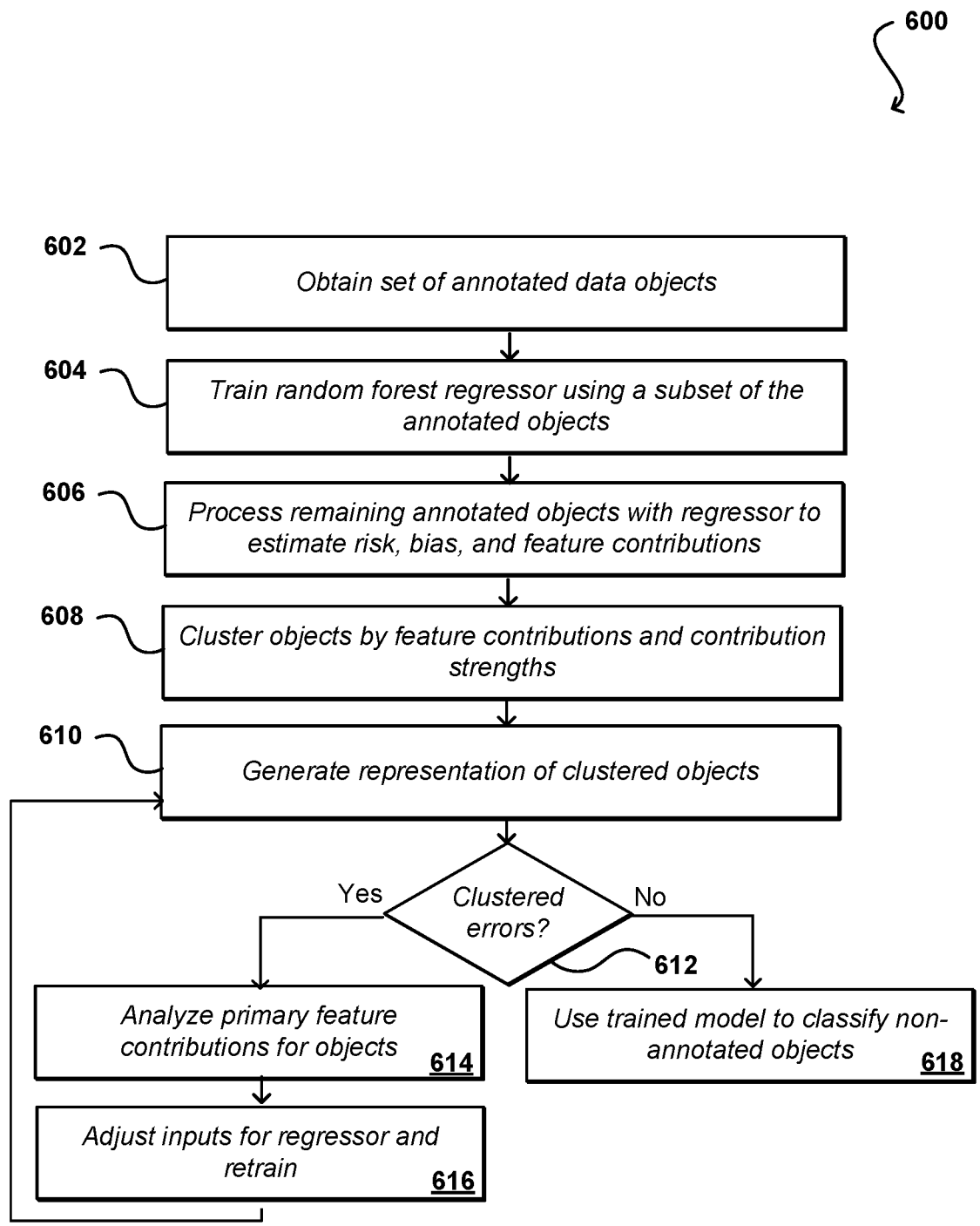
FIG. 6 illustrates an example process for training a random forest classifier and using the trained classifier to assign risk scores to data objects that can be utilized in accordance with various embodiments.

FIG. 6 illustrates an example process 600 for training a random forest regressor to estimate risk scores for data objects (e.g., objects, files, log entries, records of user actions, compressed archives, documents, or other such content) that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a set of annotated data objects is obtained 602 for an entity. The annotations can include any pertinent information, as may include an entity-determined risk score, features of interest, top contributing features, and the like. A random forest regressor, or other such classifier or machine learning algorithm, can be trained 604 using a subset of the annotated data objects. This can include half of the objects in some embodiments, while in other embodiments this can include at least a minimum number of data objects or another such subset. Once the training using the subset of annotated data objects has completed, the remaining annotated objects (or another appropriate subset) can be processed 606 using the random forest classifier. The processing can generate various values for each data object, such as an estimated risk value, a bias value, a confidence value, and/or one or more feature contributions, among other such options. The data objects can be analyzed and clustered 608 based at least in part upon the feature contributions and the strengths of those contributions. A representation of the clustered data objects can be generated 610, which can include a visualization in at least some embodiments or a mathematical representation of the clustering in other embodiments. Since the data objects were annotated with entity-determined risk scores, the estimated risk scores from the regressor can be compared against the entity-determined risk scores to determine which data objects had risk estimates that differed by more than an allowable amount from the entity-determined scores. In at least some embodiments the objects with one of these incorrect risk estimates can have its visualization or representations changed, such as by changing a color or adjusting a size of the visual node based on the level of confidence or inaccuracy. The or other approaches can be used to flag the data objects as having incorrect risk score estimates. The data objects with incorrect risk score estimates can be represented in the representation, such as by changing a color of the object nodes in a visualization. A determination can be made 612 as to whether there is any appreciable clustering of the errors. As mentioned, there may be some amount of scattered errors due to insufficient amounts of training data or rare feature combinations, for example, but there can be one or more clustering criteria specified whereby errors that are clustered within those criteria can be appropriate for regressor adjustment or retraining. If there are clustered errors located, the primary feature contributions for those data objects can be analyzed 614 to, for example, identify primary contributions, feature strengths, and other such values. The inputs to the regressor, such as the selection of features or rating of those features, can be adjusted 616 and the regressor retrained to attempt to arrive at a version of the regressor that does not exhibit the identified error clustering. The process can continue until there is no unacceptable error clustering in the representation, for example, at which point the trained model can be used 618 to classify non-annotated documents, data, and other such objects.

Figure 7:
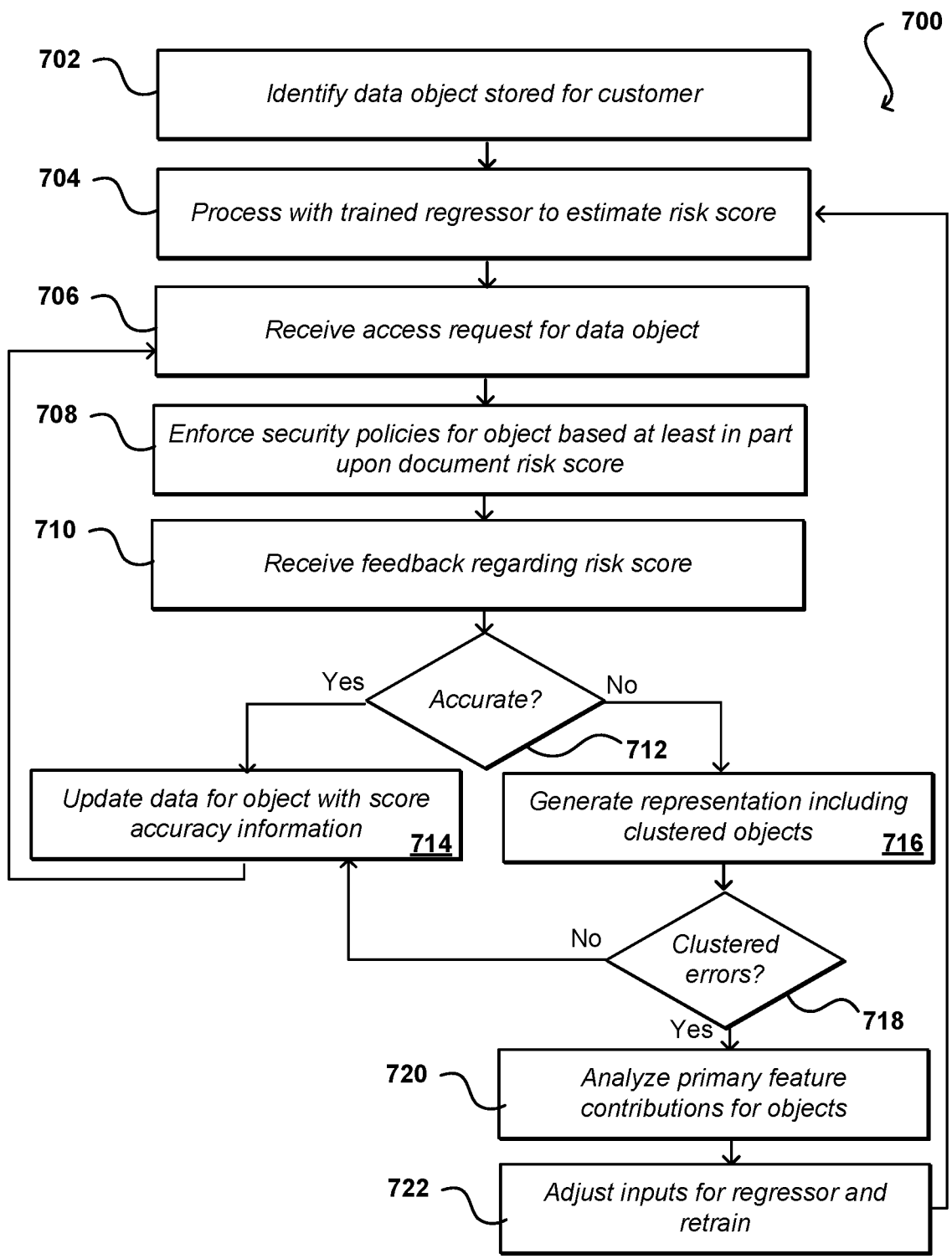
FIG. 7 illustrates an example process for generating a visualization and using that visualization to identify areas for further training of a random forest classifier that can be utilized in accordance with various embodiments.

FIG. 7 illustrates an example process 700 for using the trained regressor for determining risk scores and determining data object security that can be utilized in accordance with various embodiments. In this example, a data object stored for a customer is identified 702, whether as part of an automated process or a manual selection, among other such options. As mentioned, this can include a new document stored for a user or a log entry generated in response to a user action, among other such options. In some embodiments a corpus of data objects for an entity can be crawled to identify the stored data objects and attempt to assign risk scores, business values, or other appropriate scores to each data object. Once identified, the data object can be processed 704 using a trained random forest regressor, or other such classifier or machine learning algorithm, such as is discussed with respect to the process of FIG. 6. As mentioned, the processing can determine at least a risk score, or similar value, for the data object, and may include other estimates or determinations as well, as may relate to a bias score, confidence score, feature contributions, and the like. The risk score can then be associated with the data object, such as by annotating the data object or storing the risk score to a mapping table, among other such options.

Subsequently, a request can be received 706 that requires access to the data object. In order to determine whether to grant such access, one or more security policies can be determined, based at least in part upon the risk score, that are to be enforced for the data object. For example, a higher risk score might be associated with polices that require certain roles or permissions, or only enable specific types of access, among other such options. Once determined, the security policy can be enforced 708 for the access, which can impact whether access is granted, whether any access is limited, etc.

An entity requesting the access, receiving the access, or obtaining information about the access can then provide feedback that can be received 710 regarding risk score, and potentially other determinations by the regressor. This can include, for example, whether the score was accurately determined and the access granted was appropriate, or that the score was not accurate and the access granted, or other security policy enforced for the data object, was incorrect. The feedback in some instances can also provide information about the score that should have been determined, or access that should have been provided, at least in the mind of the person or entity providing the feedback. Whether to consider the feedback, as well as an amount of weight to give to the feedback, may depend upon factors such as a role or permission of the particular user. This can account for the fact that a user might provide feedback indicating that a determination was incorrect because the user was denied access to a data object, but in fact the user was not entitled to have access to that document.

If the feedback indicates 712 that the determination is accurate, then the data (e.g., document metadata) for the data object can be updated to indicate that the risk score was verified. The process can then continue with policies being applied to that data object based on the verified score. If, however, the feedback indicates that the risk score was not accurately estimated, a representation of the data objects can be generated 716, or consulted or updated if already generated, where the representation will include data objects clustered by feature contribution as discussed elsewhere herein. Visualizations can be used to indicate accurate and/or inaccurate risk score estimates, such as by setting a color or size as discussed elsewhere herein. If it is determined 718 that there is no appreciable clustering of errors, and that the errors are few in number and randomly scattered across the representation, then the data object data can be updated (with the incorrect determination and/or correct risk score) and the process can continue. If, however at least some clustering of errors is detected then the risk estimation system, or other appropriate system or service, can automatically analyze 720 the primary feature contributions for the clustered error objects and adjust the inputs 722 to the regressor based at least in part upon the feature contributions, in order to retrain the regressor. The regressor can be retrained in some embodiments until the clustering of errors disappears or at least reaches a maximum allowable level, among other such permissible criteria.

Figure 8:
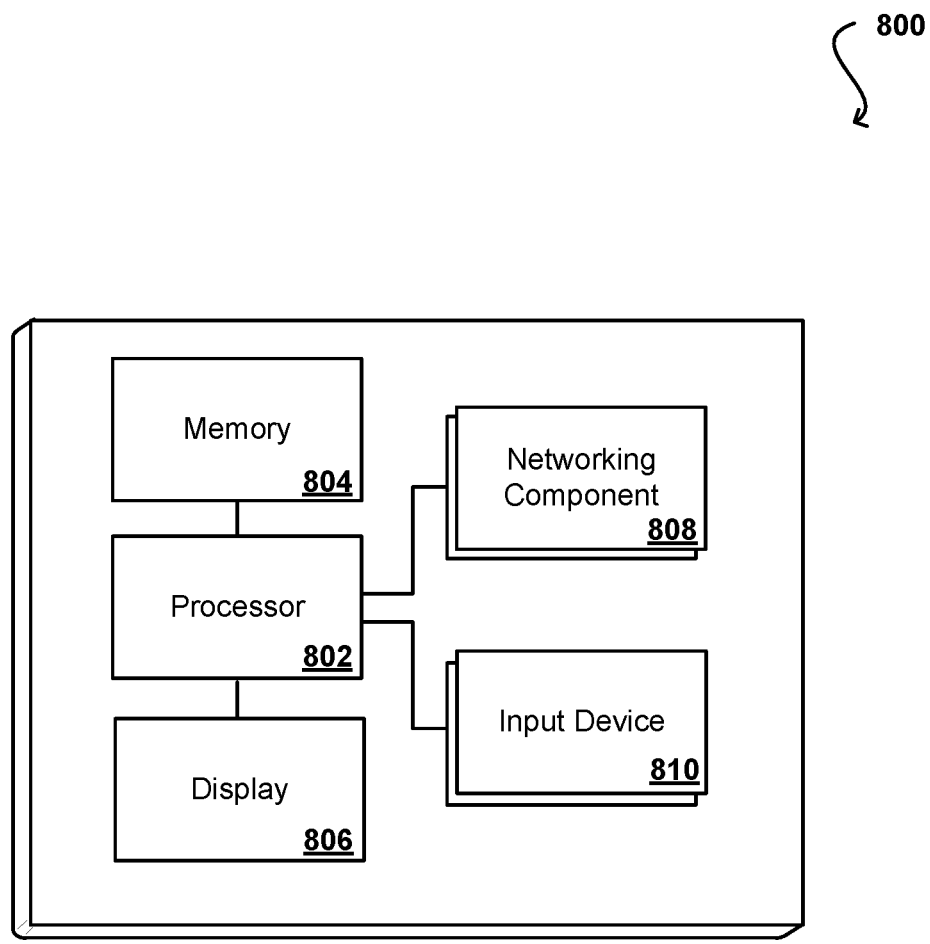
FIG. 8 illustrates example components of a computing device that can be used to implement aspects of the various embodiments.

FIG. 8 illustrates a set of basic components of an example computing device 700 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or notebook computers running a standard operating system, as well as cellular, wireless and handheld devices running mobile software and capable of supporting a number of networking and messaging protocols. Devices capable of generating events or requests can also include wearable computers (e.g., smart watches or glasses), VR headsets, Internet of Things (IoT) devices, voice command recognition systems, and the like. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
processing a set of data objects using a trained random forest regressor to estimate at least a respective risk score for the data objects of the set, the data objects including respective features indicative of a type of access to be granted to the data objects, the random forest regressor trained using a selected subset of the features;
applying at least one respective security policy to the data objects of the set based at least in part upon the respective risk score, the at least one respective security policy specifying at least access permissions for the set of data objects;
receiving an indication that a respective risk score, estimated for a specified data object of the set, is incorrect;
generating a representation including data objects as nodes clustered according to contributions of the respective features of the data objects, relative locations of the data objects with respect to one another based, at least in part, on the respective features;
determining that the specified data object is represented within a sub-cluster of erroneously scored data objects, the sub-cluster being identifiable using one or more visual indicators for respective data objects of the sub-cluster in the representation, the sub-cluster including at least a threshold percentage of total nodes forming a cluster;
selecting a new subset of the features for training the random forest regressor based at least in part upon the feature contributions for the sub-cluster of erroneously scored data objects;
retraining the random forest regressor using the new subset of features;
generating a new respective risk score for at least a subset of the data objects of the set; and
applying at least one different security policy to the subset of the data objects having the new respective risk score.

2. The computer-implemented method of claim 1, further comprising:
rendering, for display, an interactive graph corresponding to the representation;
receiving a selection of one of the nodes of the representation; and
displaying at least the respective risk score and the feature contributions for the data object corresponding to the selected node.

3. The computer-implemented method of claim 1, further comprising:
automatically adjusting the inputs and retraining the random forest regressor until a clustering of the erroneously scored data objects satisfies at least a minimum confidence threshold.

4. The computer-implemented method of claim 1, further comprising:
obtaining a plurality of annotated data objects including at least determined risk scores;
training a random forest regressor using a subset of the plurality of annotated data objects; and
testing the random forest regressor using a remainder of the plurality of annotated data objects.

5. A computer-implemented method, comprising:
processing a set of data objects using a trained classifier to generate respective risk scores for the set of data objects, the classifier trained using a selected subset of features contained within the set of data objects;
generating a representation of the set of data objects, wherein respective positions of the data objects are based at least in part upon contributions of the features of the data objects, the respective positions of the data objects being at least partially clustered by the contributions;
determining a clustering of at least a subset of erroneously scored data objects in the representation, the subset being identifiable using one or more visual indicators for respective data objects of the subset in the representation, the subset including at least a threshold percentage of total data nodes clustered in the representation;
determining a new subset of features for training the classifier based at least in part upon the contributions of the features of the erroneously scored data objects clustered in the representation;
retraining the classifier using the new subset of features; and
providing the classifier for processing user data objects to determine at least respective risk scores for the user data objects.

6. The computer-implemented method of claim 5, further comprising:
processing the user data objects using the classifier to determine at least the respective risk scores; and
applying security policies to the user data objects based at least in part upon the respective risk scores.

7. The computer-implemented method of claim 5, further comprising:
obtaining indication that one or more respective risk scores for the user data objects is inaccurate;
generating a second representation including the user data objects;

determining a second clustering of at least a second subset of the user data objects determined to have inaccurate risk scores;

determining an updated subset of features based at least in part upon the contributions of the subset of the user data objects determined to have inaccurate risk scores; and retraining the classifier using the updated subset of features.

8. The computer-implemented method of claim 5, wherein the classifier is a random forest regressor.

9. The computer-implemented method of claim 5, wherein the feature contributions relate to at least one of keywords, sources, frequency of access, types of access, sharing parameters, file size, regulatory content, confidential content, time since last access, or scheduled release.

10. The computer-implemented method of claim 5, further comprising:

generating a visualization corresponding to the representation; and indicating, through the visualization, data objects with inaccurate risk score estimates, wherein a viewer of the visualization is able to determine relative clustering of the data objects with inaccurate risk scores.

11. The computer-implemented method of claim 10, further comprising:

receiving a selection of one of the data objects through the visualization; and displaying human-understandable information about the feature contributions used to estimate the respective risk score for the selected data object.

12. The computer-implemented method of claim 10, further comprising:

enabling the viewer to submit a corrected risk score for the selected data object.

13. The computer-implemented method of claim 10, further comprising:

displaying, as part of the visualization, edges between the data objects of the visualization, wherein strengths of the edges are determined by a number of common feature contributions.

14. The computer-implemented method of claim 5, further comprising:

applying a force-atlas layout to the data objects of the representation in order to provide for a clustering of the data objects in the representation.

15. The computer-implemented method of claim 5, further comprising:

determining a location for each data object in the representation based upon a feature vector for the data object, the feature vector based on feature contributions for the data object.

16. A system, comprising:

at least one processor; and memory including instructions that, when executed by the at least one processor, cause the system to:

process a set of data objects using a trained classifier to generate respective risk scores for the set of data objects, the classifier trained using a selected subset of features contained within the set of data objects generate a representation of the set of data objects, wherein respective positions of the data objects are based at least in part upon contributions of the features of the data objects, the respective positions of the data objects being at least partially clustered by the contributions;

determine a clustering of at least a subset of erroneously scored data objects in the representation, the subset being identifiable using one or more visual indicators for respective data objects of the subset in the representation, the subset including at least a threshold percentage of total data nodes clustered in the representation;

determine a new subset of features for training the classifier based at least in part upon the contributions of the features of the erroneously scored data objects clustered in the representation;

retrain the classifier using the new subset of features; and provide the classifier for processing user data objects to determine at least respective risk scores for the user data objects.

17. The system of claim 16, wherein the instructions when executed further cause the system to:

process the user data objects using the classifier to determine at least the respective risk scores; and apply security policies to the user data objects based at least in part upon the respective risk scores.

18. The system of claim 16, wherein the instructions when executed further cause the system to:

obtain indication that one or more respective risk scores for the user data objects is inaccurate;

generate a second representation including the user data objects;

determine a second clustering of at least a second subset of the user data objects determined to have inaccurate risk scores;

determine an additional subset of features based at least in part upon the contributions of the subset of the user data objects determined to have inaccurate risk scores; and retrain the classifier using the additional subset of features.

19. The system of claim 16, wherein the instructions when executed further cause the system to:

generate a visualization corresponding to the representation; and indicate, through the visualization, data objects with inaccurate risk score estimates, wherein a viewer of the visualization is able to determine relative clustering of the data objects with inaccurate risk scores.

20. The system of claim 19, wherein the instructions when executed further cause the system to:

receive a selection of one of the data objects through the visualization;

display human-understandable information about the feature contributions used to estimate the respective risk score for the selected data object; and enable the viewer to submit a corrected risk score for the selected data object.

* * * * *